United States Patent [19]

Pitt et al.

[11] 4,372,165
[45] Feb. 8, 1983

[54] APPARATUS FOR MEASURING FLUID FLOW

[75] Inventors: Gillies D. Pitt, Saffron Walden; Roger J. Williamson, Harlow, both of England

[73] Assignee: ITT Industries, Inc., New York, N.Y.

[21] Appl. No.: 185,629

[22] Filed: Sep. 10, 1980

[30] Foreign Application Priority Data

Sep. 11, 1979 [GB] United Kingdom ................ 7931477

[51] Int. Cl.³ ........................ G01F 1/32; G01N 21/41
[52] U.S. Cl. .................................. 73/861.22; 356/133
[58] Field of Search ............... 356/132, 133, 135, 136; 73/861.22; 250/573, 574

[56] References Cited

U.S. PATENT DOCUMENTS

| | | | |
|---|---|---|---|
| 2,807,976 | 10/1955 | Vossberg | 356/136 |
| 3,572,117 | 3/1971 | Rodely | 73/861.22 |
| 3,732,731 | 5/1973 | Fussell, Jr. | 73/861.22 |
| 3,733,897 | 5/1973 | Herzl | 73/861.22 |
| 4,206,642 | 6/1980 | Bearcroft | 73/861.24 |

FOREIGN PATENT DOCUMENTS

| | | | |
|---|---|---|---|
| 2301808 | 9/1976 | France | 73/861.22 |
| 52-51988 | 4/1977 | Japan | 356/133 |
| 1483818 | 8/1977 | United Kingdom | 73/861.22 |

OTHER PUBLICATIONS

Lyle, J. H. et al., "Vortex Shedding Fluid Flowmeter Using Optical Fiber Sensor," Electronics Letters, vol. 17, No. 6, 3/19/81, pp. 244-245.

Primary Examiner—Bruce Y. Arnold
Attorney, Agent, or Firm—A. Donald Stolzy

[57] ABSTRACT

A fluid flowmeter of the vortex shedding type. The vortex frequency is determined from variations in the internal reflectivity of a prism 16 mounted in the fluid and coupled to a light source 13 and to a detector/frequency meter 14 via an optical waveguide arrangement 15. Passage of a vortex adjacent the prism 16 causes a temporary change in the local fluid refractive index and hence a change in the intensity of light internally reflected by the prism.

4 Claims, 2 Drawing Figures

APPARATUS FOR MEASURING FLUID FLOW

BACKGROUND OF THE INVENTION

1. Field of the Invention

The invention relates to fluid flowmeters and in particular to flowmeters of the vortex shedding type in which the vortices are detected optically.

2. Description of the Prior Art

In flowmeters of the vortex shedding type a so-called bluff body is placed in the fluid stream and sheds vortices into the fluid at a frequency which is a function of the fluid flow velocity. Thus by detecting these vortices and measuring the rate at which they are generated the flow velocity of the fluid can be determined.

The phenomenon of changing index of refraction in a fluid medium as a function of fluid density is known and has been exploited for density measurement. The instrumentations of the prior art and their purposes are varied, typical examples being shown in British Pat. Nos. 981,753; 1,362,732; and 1,514,977. A flowmeter instrumentation employing a vortex shedding bluff body in a fluid flow for creating vortices is described in British Pat. No. 1,544,636. The detection of passing vortices is effected through changes in light attennuation in an unclad optical fiber in the fluid flow downstream from the bluff body. Although that arrangement is workable, it will be seen that the invention provides a more sensitive vortex detector of more rugged structure. The details of construction and operation of a typical embodiment according to the invention will be understood from the description following.

SUMMARY OF THE INVENTION

According to the invention there is provided a fluid flowmeter of the type in which the flow velocity of a fluid is determined by measuring the frequency at which vortices are shed from a bluff body arranged in the fluid stream, the arrangement including a prism mounted in the fluid stream, means for directing light into the prisms so as to provide a totally internally reflected beam, means for measuring the intensity of the reflected beam, and a frequency meter coupled to the output of the intensity measuring means. The prism is so constructed with respect to the light directing means that the reflectivity of at least one surface of the prism varies in response to variations in the refractive index of the fluid caused by a passing fluid vortex.

A vortex in a fluid causes local changes in density and hence changes in refractive index of the fluid. Thus, by employing an optical detector of the type which responds to refractive index changes the presence of such vortices is determined.

An optical fiber arrangement provides for conveyance of illumination into and from the prism.

DETAILED DESCRIPTION OF THE PREFERRED EMBODIMENTS

Figure 1:
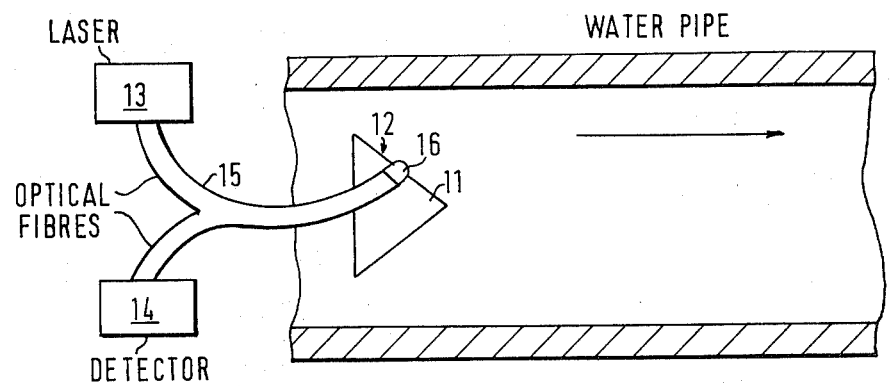
FIG. 1 is a schematic diagram of the vortex flowmeter according to the invention.

Referring to FIG. 1 of the drawings, vortices are generated in a moving fluid by a bluff body 11 placed in the fluid stream. This part of the structure is known per se, in the prior art. Typically the body 11 is wedge shaped with its apex directed downstream.

Vortices shed from the body 11 are detected via an optical sensor 12 protruding through the surface of the body and coupled to the light source 13 and a detector/frequency meter arrangement 14 via a Y-type fibre optic waveguide 15.

Figure 2:
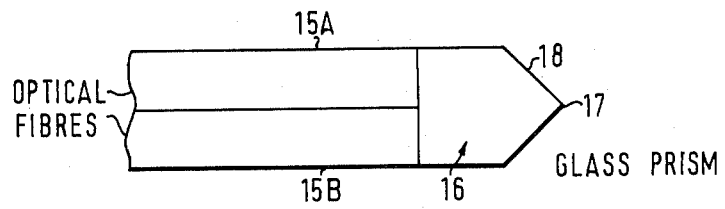
FIG. 2 shows details of the optical detector and prism interface of the flowmeter of FIG. 1.

As shown in FIG. 2 the sensor 12 comprises a prism 16 whose apex 17 protrudes into the fluid stream. Light is supplied, typically from a semiconductor, light-emitting device, to the prism via one half, 15A, of the waveguide and is internally reflected via the facets (of which facet 18 is one of two) of the prism back into the other half, 15B, of the waveguide and thence to the detector/frequency meter 14. Preferably monochromatic light is employed.

The internal reflection characteristic of each facet of the prism 16 is a function of the angle of incidence of a light beam and of the difference in refractive indices between the prism and the adjacent fluid. The shedding of vortices from the bluff body into the fluid causes transient changes in the fluid refractive index and hence causes corresponding changes in the intensity of the reflected light beam received by the portion 15A of the waveguide. These variations in the reflected beam are then detected and their periodicity (frequency) measured to give an analog value representative of the fluid velocity.

For simplicity the prism 16 shown in FIG. 2 has a single symmetrical triangular portion, i.e. there are only two facets at which light is reflected. In practice, however, an asymmetric prism or a prism with a plurality of reflecting facets may be used. In this way the prism can be so constructed that light strikes at least one facet substantially at the critical angle thus enhancing the sensitivity of the arrangement, and therefore the multi-faceted prism may be considered preferable.

The Y-type optical fiber arrangement 15 is split into two branches 15A and 15B according to known techniques for handling optical fibers. Functionally, 15A and 15B behave as separate light conductors.

What is claimed is:

1. A fluid flowmeter of the type in which the flow velocity of a fluid is determined by measuring the frequency at which vortices are shed from a bluff body arranged in the fluid stream, comprising:

a prism mounted on said bluff body in the fluid stream;

a light source and means for directing light into said prism so as to provide an internally reflected beam;

means for measuring the intensity of said reflected beam; and a frequency meter coupled to the output of said intensity measuring means to determine the rate of variation of said reflected beam intensity, said prism being constructed with respect to said light directing means so that the reflectivity of at least one surface of said prism varies in response to variations in the refractive index of the fluid caused by passing fluid vortices.

2. A flowmeter according to claim 1 in which said light source is defined as a monochromatic source.

3. A fluid flowmeter as claimed in claim 2, and wherein said prism is so constructed that light strikes at least one facet substantially at the critical angle.

4. A fluid flowmeter as claimed in claim 2 or 3, and wherein said light source is a semiconductor light-emitting device.

* * * * *